May 21, 1968
V. S. SWITLISKI ET AL
3,383,834
BOX LIDDING MACHINE
Filed Oct. 11, 1965
5 Sheets-Sheet 1
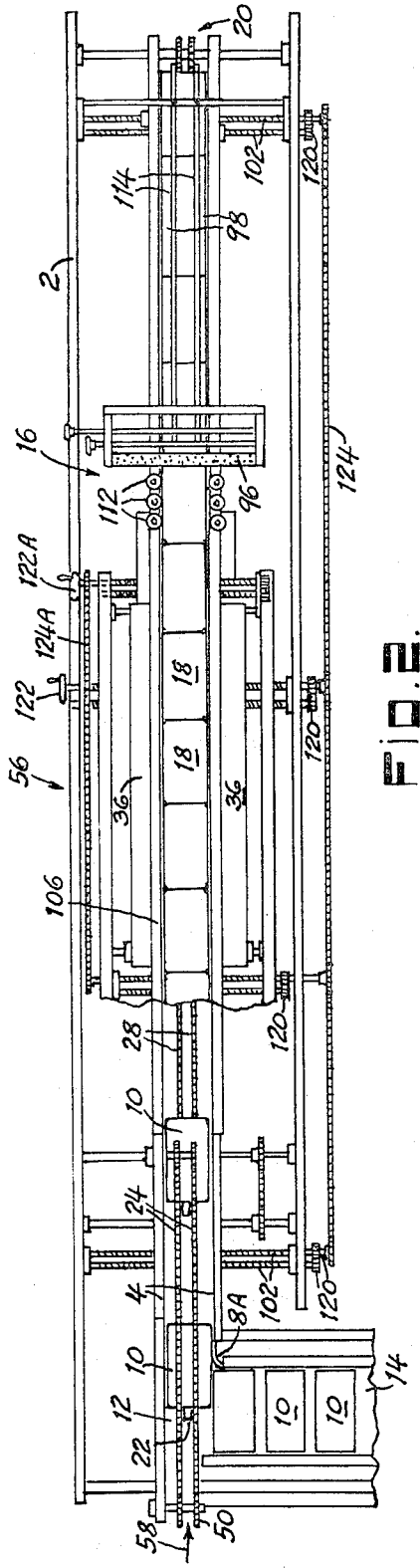
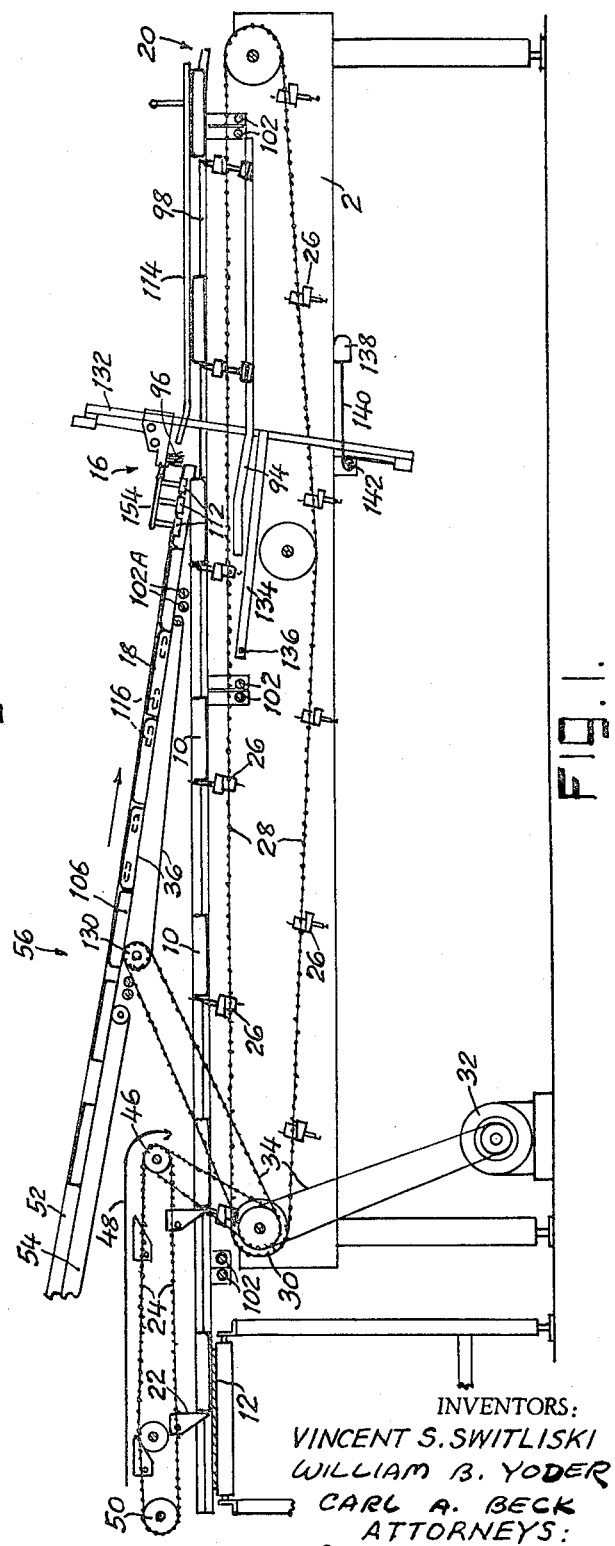
INVENTORS:
VINCENT S. SWITLISKI
WILLIAM B. YODER
CARL A. BECK
ATTORNEYS:
Sperry and Zoda

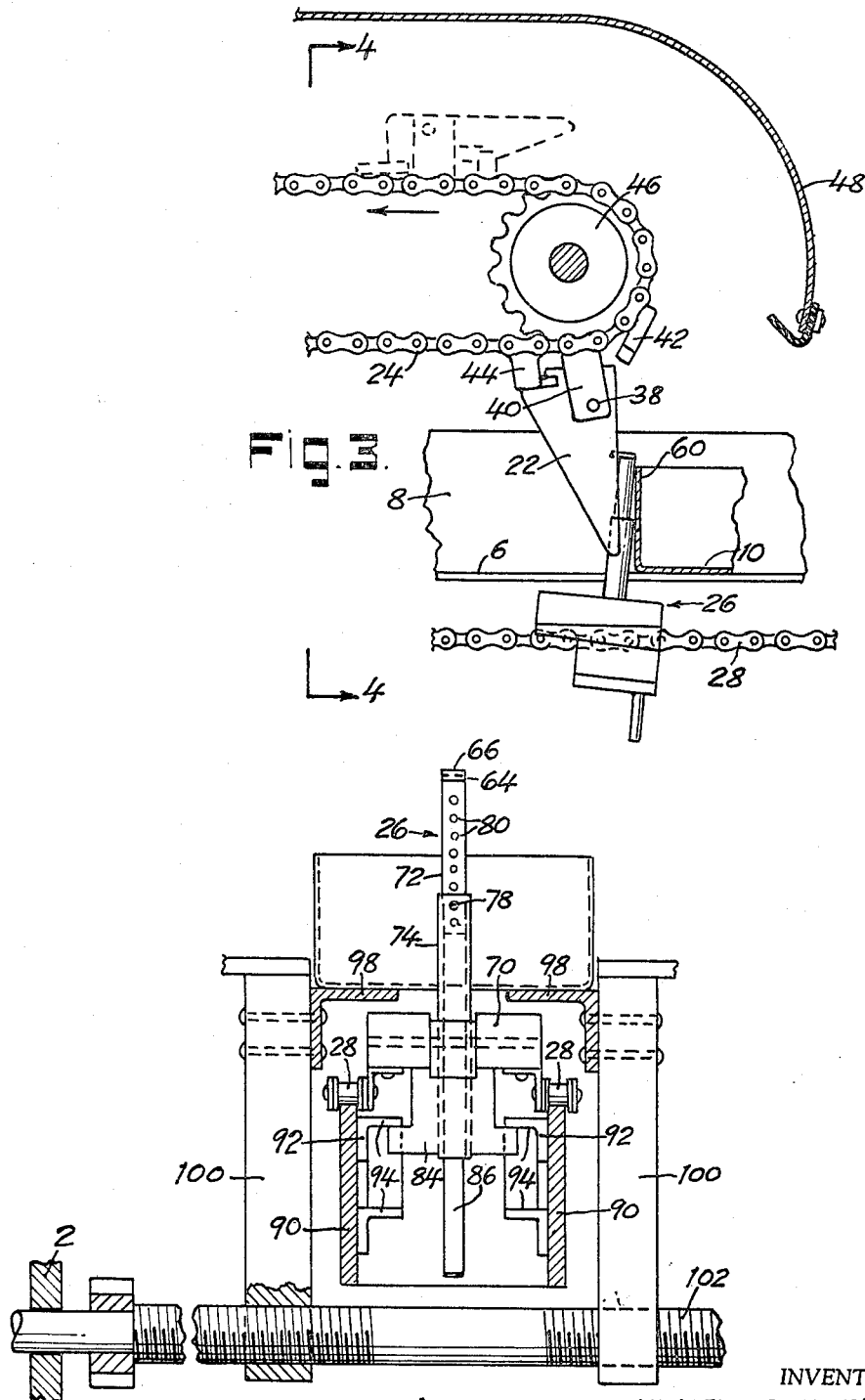

May 21, 1968  V. S. SWITLISKI ET AL  3,383,834
BOX LIDDING MACHINE

Filed Oct. 11, 1965  5 Sheets-Sheet 3

INVENTORS:
VINCENT S. SWITLISKI
WILLIAM B. YODER
CARL A. BECK

ATTORNEYS:
Sperry and Zoda

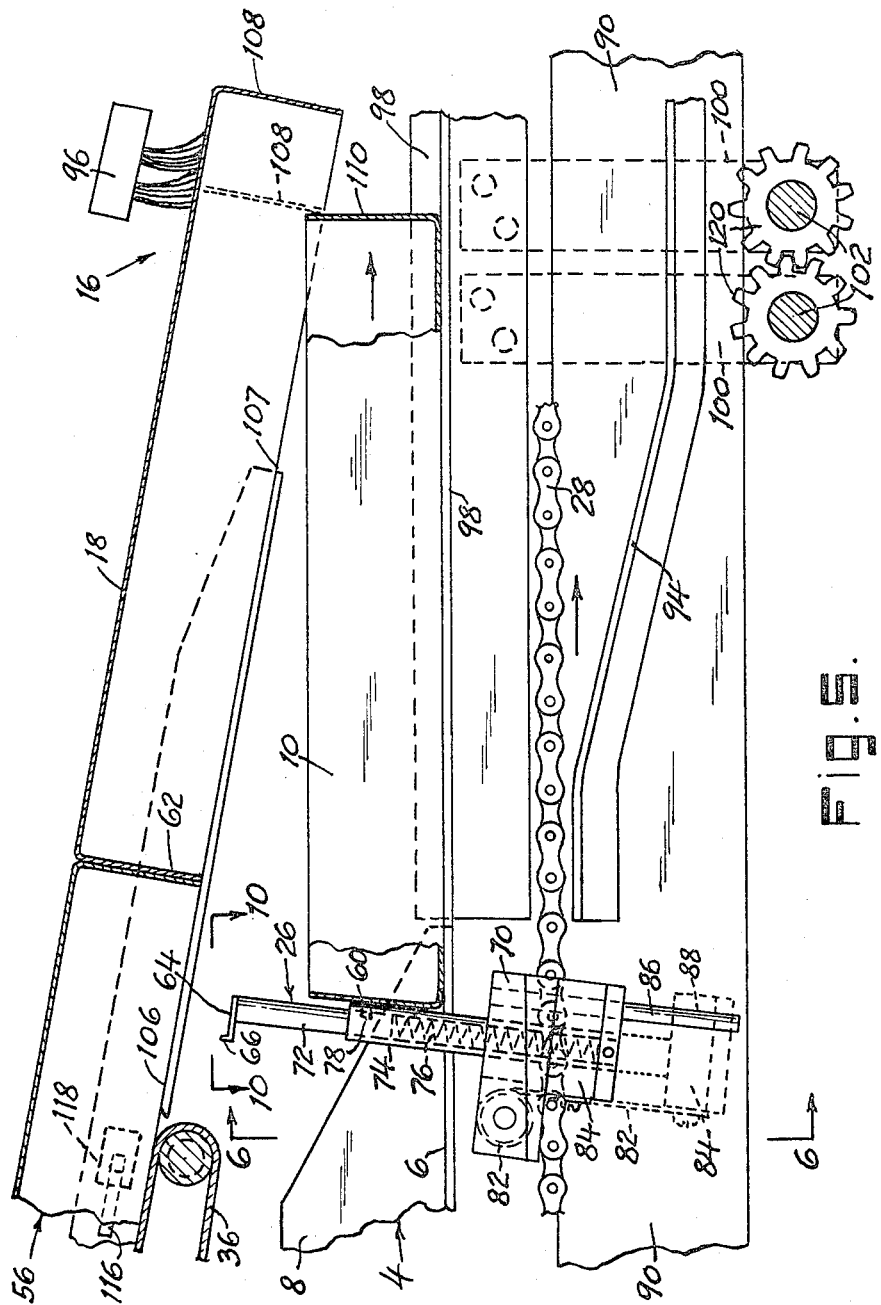

INVENTORS:
VINCENT S. SWITLISKI
WILLIAM B. YODER
CARL A. BECK
ATTORNEYS:
Sperry and Zoda

United States Patent Office 3,383,834
Patented May 21, 1968

3,383,834
BOX LIDDING MACHINE
Vincent S. Switliski, Glenolden, William B. Yoder, Glenside, and Carl A. Beck, Bala Cynwyd, Pa., assignors to Charles Beck Machine Corporation, King of Prussia, Pa., a corporation of Pennsylvania
Filed Oct. 11, 1965, Ser. No. 494,538
7 Claims. (Cl. 53—315)

ABSTRACT OF THE DISCLOSURE

Equipment for applying lids to the bases of boxes movable along a support including longitudinally spaced members which project above the support to engage and move the bases of boxes to an assembly point where the lids are applied to the bases. The members which engage the bases of the boxes are adjustably mounted on assemblies so as to project a predetermined distance above the support depending upon the depth of the base of the box and/or the lid being applied thereto. The members preferably are engageable with the rear end of a base and the rear end of a cover and are movable vertically to guide the rear end of the cover into embracing engagement with the rear end of the base of the box to which it is being applied.

This invention relates to machines for applying lids or covers to the base portion of boxes and is directed particularly to the application of covers to bases containing cards, folders, leaflets, or other articles which may project above the top of the box or beyond one or more sides or ends thereof.

In the packaging of Christmas or greeting cards and the like in boxes, the cards are frequently folded and, therefore, tend to expand so as to project above the top of the box in which they are packaged. The cards then may be displaced so that they extend over the sides or ends of the base in such a way as to prevent application of a cover to the base without first rearranging the cards to prevent bending thereof when the cover is applied.

Difficulties are further encountered when applying covers to the bases of newly formed rigid ("set-up") boxes for the reason that the sides and ends of the base generally tend to bow outward in such a way as to preclude ready application of a cover to the base.

In accordance with the present invention, machines are provided which automatically serve to reposition any cards which may project beyond the sides or ends of a base and to overcome bulging of the sides or ends of the base while applying a lid or cover to each of a series of bases as they pass through the machine. These results are attained by providing means which not only serve to press against the sides and rear end of the base so as to assure its having a rectangular form when the cover is applied thereto but which also serve to engage any projecting cards, leaflets or folders to restore or relocate them within the confines of the sides of the base and to guide the lid or cover as it is pressed down about the sides of the base.

Accordingly, the principal objects of the present invention are to facilitate the application of lids or covers to bases of boxes, to confine the contents of the base of a box to which a lid is being applied so as to prevent damage to the contents, lid or box; to speed up the operation of applying lids to the bases of boxes; and to provide machines which are automatic and rapid in operation for use in applying lids or covers to boxes.

These and other objects and features of the present invention will appear from the following description thereof wherein reference is made to the figures of the accompanying drawings.

In the drawings:

FIG. 1 is a side elevation of a portion of one preferred form of machine embodying the present invention;

FIG. 2 is a plan view of the machine illustrated in FIG. 1;

FIG. 3 is an enlarged view of a prefered form of base advancing means embodied in the machine of FIG. 1;

FIG. 5 is a side view, partly in section, illustrating typical base and lid guiding and moving means employed in the machine of FIG. 1;

FIG. 6 is a sectional view of the construction shown in FIG. 5 taken on the line 6—6 thereof;

Figure 7:
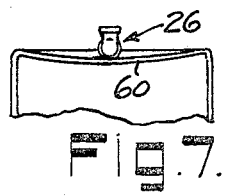
FIG. 7 is a diagrammatic plan view of a base to which a lid or cover is being applied.

In that form of the invention chosen for purposes of illustration in the drawings, the equipment has a main frame 2 with two spaced parallel base and box guiding members 4 thereon extending longitudinally of the frame. The members 4 are preferably in the form of angle irons which are arranged to present inwardly extending supporting flanges 6 and upwardly extending side guiding flanges 8 as shown most clearly in FIGS. 3 and 4. The filled bases 10 of the boxes are supplied to the box guiding members 4 at the left-hand end of the equipment as seen in FIG. 1. For this purpose, the boxes are fed onto a loading platform 12 adjacent the ends of the box guiding members 4 by hand or by suitable means such as the conveyor 14 of a collating or base filling machine (not shown) or they may be received from any other suitable source of supply. The side guiding flanges 8 of the base guiding members 4 preferably are of a height exceeding that of the filled bases 10 and they are inclined inward adjacent the loading platform 12 as shown at 8A in FIGS. 2 and 4 so that any cards or contents of the base which project laterally therefrom will be passed back between the sides of the base to permit proper application of a lid or cover thereto.

The filled bases 10 of the boxes with the cards confined therein then are pushed along the base supporting flanges 6 between the side guiding flanges 8 to the lid applying station indicated generally at 16 in FIGS. 1, 2 and 5 where the lids or covers 18 are applied to the bases to complete the boxes. The completely covered and closed boxes then are moved on to a delivery point indicated at 20 at the right-hand end of the equipment as shown in FIGS. 1 and 2. The movement of the filled bases 10 of the boxes may be timed to relate to the operation of the collating or filling machine or may be otherwise controlled as desired to assure the proper movement of the filled boxes to the lid applying station 16 and the rapid and proper application of lids 18 to the bases to complete the boxes and move them on to the delivery station 20.

Figure 4:
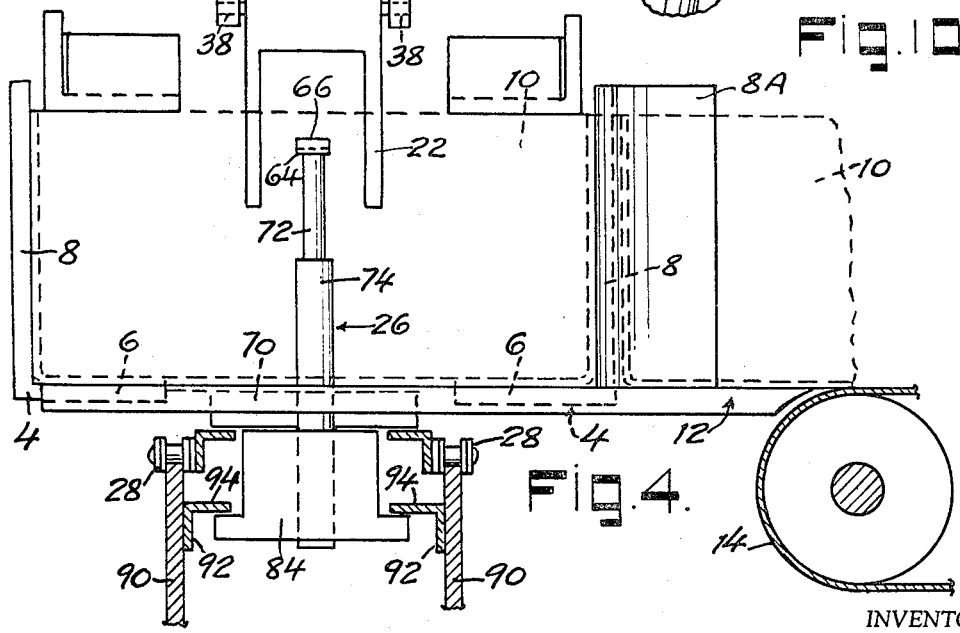
FIG. 4 is a sectional view of the construction shown in FIG. 3 taken on the line 4—4 thereof.
Figure 11:
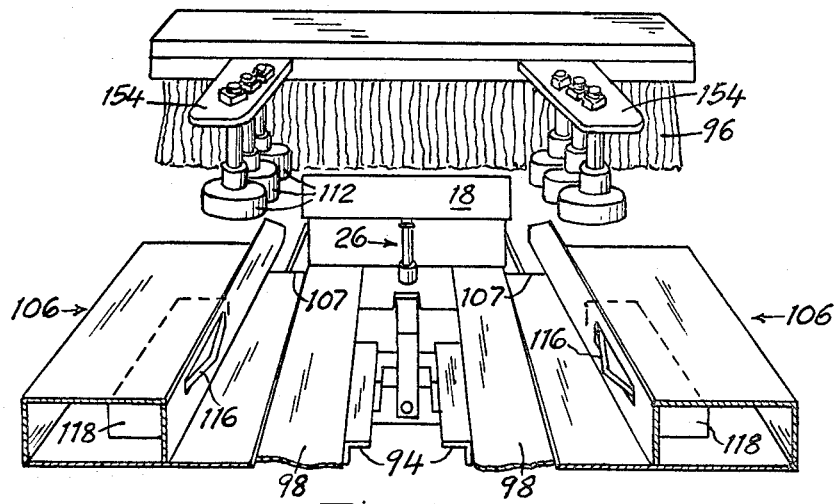
FIG. 11 is a perspective view showing the rear end of a lid and base during the application of a lid to a base.

A preferred form of means for thus moving the bases and boxes is shown in FIGS. 2, 4 and 5 wherein the initial movement of the bases from the loading platform 12 onto the supporting flanges 6 of the guide members 4 is effected by base advancing fingers 22 carried by parallel chains 24 whereas further movement of the bases past the lid applying station 16 to the delivery point 20 is accomplished by box moving finger assemblies 26 carried by parallel chains 28. Both the chain 24 and the chains 28 are driven by a common motor 32 through suitable driving connections 34. The motor 32 also may drive the conveyor 14 of the collating or base filling equipment or the latter equipment may be controlled in any other desired way to coordinate the operation thereof with that of the lid applying equipment of the present invention. In any event, the chains 24 and 28 with their box moving fingers and assemblies should be advanced at a speed which will assure suitable spacing of the bases as they approach the lid applying station 16 to permit proper application of the lids or covers to the filled bases.

The base advancing fingers 22 carried by chains 24 are preferably formed as shown in FIGS. 3 and 4 so as to be pivotally mounted at 38 on lugs 40 which project outwardly from the chains 24. Finger locking elements 42 and 44 are then carried by the chains 24 and located in the front and rear respectively of the lugs 40 in position to engage and hold the box advancing fingers 22 in a downwardly projecting, base-engaging position during the lower run of the chains 24. However, as shown in FIG. 3 upon movement of the chains 24 upward about the sprocket 46 from the lower to the upper run thereof, the locking elements 42 and 44 move radially and away from the lug 40 so as to disengage and release the box engaging fingers 22. Upon movement of the fingers 22 with chain 24 upward about sprocket 46, the fingers will be folded down by engagement with a guard 48 whereby they will remain in a lowered position as shown in dotted lines in FIG. 3 until they reach the sprocket 50 at the other end of the upper run of the chains. The fingers 22 then will be freed to swing outward and downward under the action of gravity as they pass about the sprocket 50 whereby they will again be held in their downwardly projecting, base-engaging position for advancing another base from the loading platform 12 to a position wherein it will be engaged by a box moving finger 26 of the chains 28. This folding of the fingers 22 as they pass about the sprocket 46 and along the upper run of the chains 24 renders it possible to limit the space between the box guiding members 4 and the inclined guide means 52 and frame 54 of the lid supplying means 56 along which the lids 18 are moved to a lid feeding belt 36 on the adjustable lower end portion 106 of the lid applying means. Furthermore, the location of the chains 24 above the filled bases 10 with their downwardly projecting base advancing fingers 22 renders it possible to use alternative arrangements for feeding the filled bases onto the loading platform 12. Thus, the base feeding means may be arranged to feed the filled bases in a direction transverse to the box guiding members 4 onto the loading platform 12 as represented by the conveyor 14 in FIG. 2 or may in the alternative be arranged to feed the filled bases onto the loading platform 12 in endwise alignment with the box guiding members 4 in the direction indicated by the arrow 58 in FIG. 1.

As shown in FIG. 4, the base advancing fingers 22 on chains 24 preferably embody two spaced members between which the finger assemblies 26 on chains 28 are movable, and as seen in FIGS. 1 and 3, the chains 28 pass about sprockets 30 which are positioned below and to the left of the sprockets 46 which advance the chains 24. In this way, the finger assemblies 26 will be centered with respect to the filled bases 10 as they push the bases along the box guiding members 4 to the lid applying station 16 of the equipment.

Figure 8:
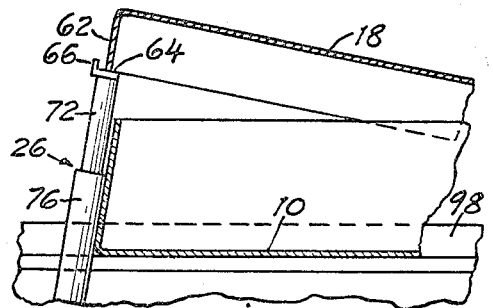
FIGS. 8, 9 and 10 are diagrammatic vertical sectional views illustrating successive stages in the application of lids to the bases of boxes.
Figure 9:
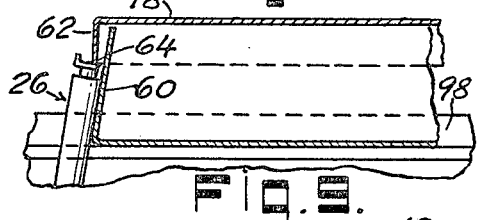
Figure 10:
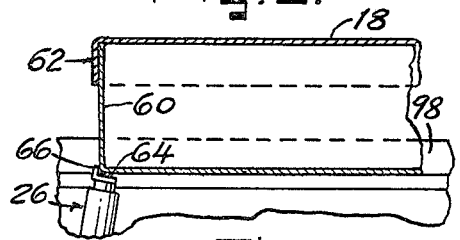

The chains 28 and their box moving finger assemblies 26 are so constructed and actuated that they will serve several distinct purposes. Thus the fingers 26 initially project above the rear end 60 of each base 10 as they move into engagement therewith and thereby prevent any cards from being displaced relative to the base to positions wherein they project beyond the rear end 60 of the base. The fingers 26 further are inclined forwardly and positioned near the midportion of the rear end 60 of the base, as shown in FIGS. 7, 8 and 9 so that the central portion and upper edge of the rear end 60 will be pressed inward when the lid 18 is applied to the base. In this way, any tendency for the base to be bowed rearwardly by reason of the fact that the base is newly formed, or because the contents tend to bulge the rear end outwardly, is overcome. As a result, the application of the lid to the base is facilitated. The fingers 26 are also positioned to engage the rear end 62 of the lid or cover 18 being applied to the base as shown in FIGS. 8 and 9 and are movable downwardly as shown in FIG. 9 as the lid is applied to guide the rear end 62 of the lid so that it will properly embrace the rear end 60 of the base during the lid applying operation. Finally, the fingers 26 preferably are provided with a head 64 having an upwardly projecting lip 66 thereon which is engageable with the lid or base of the fully closed box as shown in FIG. 10 to continue to move the box along the box guiding members 4 from the lid applying station 16 to the delivery point 20.

In order to attain these advantages in the operation of the fingers 26, each finger is in the form of an assembly of elements mounted on a block 70 which extends between the parallel chains 28. The fingers 26 preferably include a rod 72 slidable within a sleeve 74 carried by the block 70 and are suitably inclined forwardly as shown in FIG. 5. The rod 72 has the head 64 and lip 66 secured to the upper end thereof and is urged upwardly within the sleeve 74 by a spring 76. The upward movement of the rod 72 with respect to the sleeve 74 is limited by a stop pin 78 adjustable to a proper hole 80 in the rod 72 determined by the depth of the bases 10 to which lids are to be applied and the depth of the lids being applied to the base.

The sleeve 74 in which the rod 72 is slidable is itself movable vertically with respect to the block 70 and for this purpose is urged upwardly by a flat-coil spring 82 carried by the block and secured to a cam follower 84 mounted on the lower end of the sleeve 74. A guide pin 86 projects downwardly from the block 70 and passes through a guide opening 88 in the cam follower 84 to guide the sleeve 74 and the cam follower during movement thereof with respect to the block 70.

The frame 2 of the equipment has a pair of spaced parallel chain guiding strips 90 mounted thereon which, as shown in FIGS. 4 and 5, are positioned to receive and support the upper run of the chain 28 in that portion thereof adjacent the lid applying station 16. Angle members 92 are mounted on the inwardly facing sides of the strips 90 below the chains 28 and present inwardly projecting flanges 94 which as shown in FIGS. 5 and 6, serve as camming strips engageable by the cam followers 84 of the finger assemblies 26 carried by chains 28. Movement of the chains and fingers toward the lid applying station 16 thus serves to cause the cam follower 84 and the sleeve 74 and rod 72 of each finger 26 to be moved downward as a lid or cover 18 is applied to a base 10 in passing beneath the brush or pressing member 96 of the lid applying means at station 16.

Box supporting members 98 are located beyond the ends of the base guiding members 4 in position to receive and support the bases 10 of the boxes as they pass beneath and beyond the pressing member 96 at lid applying station 16 and on to the discharge point 20 of the equipment. The box supporting members 98 as shown in FIGS. 5 and 6, are mounted on blocks 100 which are threaded to receive transversely extending threaded adjusting rods 102 mounted for rotation on the main frame 2 of the equipment. Therefore, the bases and boxes are held in horizontal alignment as they pass through the equipment from the loading platform 12 at one end thereof where the filled bases 10 are received to the delivery point 20 at the other end of the equipment where the finished covered boxes are discharged from the equipment.

The lid supplying means 56 as shown has the frame 54 upon which the lid advancing belt 36 is mounted. The frame 54 is inclined to converge toward the base guiding members 4 and the box supporting members 98 adjacent the brush or pressing member 96 at the lid applying station 16. The guide means 52 of the members forming the frame 54 are positioned to guide the lids or covers 18 as they are advanced to a lid feeding belt 36 driven by motor 32 and mounted on adjustable end portion 106 of the lid supplying means. The lower extremity 107 of the end portion 106 is spaced from the brush or pressing member 96 a distance sufficient to allow the downwardly turned end 108 of the foremost lid on the supply means to project beyond and below the extremity 107 into engagement with brush 96. At the same time, as shown in FIG. 5, the extremity 107 of the adjustable end portion 106 of the lid supplying means is also spaced from the box supporting members 98 a distance somewhat exceeding the depth of the bases 10 to which the lids 18 are to be applied. In this way, the filled bases 10 may be advanced by fingers 26 on the chains 28 beneath the extremity 107 and into the dotted line position of FIG. 5 wherein the front end 110 of each base 10 will engage the downwardly turned front end 108 of a lid 18 engaging brush 96. The front end of the lid is thus caused to push any forwardly projecting cards in the base back within the confines of the base and further is caused to engage and fit about the front end of the base. Thereafter, the finger 26 pressing against the rear end 60 of the base will push the partially assembled base 10 and lid 18 on beneath the brush or pressing means 96 to complete the application of the lid to the base. Rollers 112 adjustably mounted in advance of the pressing member 96 engage the sides of the lid 18 as it is applied to the base 10 so as to overcome any tendency for the lid to be distorted or to bulge outward in a manner to interfere with the proper application of the lid to the base 10.

As the base and lid are advanced together beneath the pressing member 96 by finger 26, the rear end 62 of the lid will pass beyond the extremity 107 of the lower end portion 106 of the lid supplying means so as to drop onto and be supported by the head 64 of the finger assembly 26. Upon continued forward movement of the chains 28 and finger assemblies 26, the lid 18 will be pressed down by the brush 96 toward the base 10 by which it is being advanced whereby the rod 72 of the finger assembly will be depressed within the sleeve 74 against the action of spring 76 as shown in FIGS. 8 and 9. During this stage of the lid applying operation, upwardly projecting and forwardly inclined or tilted position of the finger 26 serves to press the rear end 60 of the base 10 inward and prevents rearward movement of any cards projecting above the base as the rear end 62 of the lid is gradually moved downward about the rear end of the base. As a result, the application of each lid to a base takes place smoothly, accurately and without any possibility of interference by reason of any outward bulging of the sides or ends of the base and without the possibility of any cards or contents projecting laterally above the base into positions wherein they might interfere with the application of the lid or cover to the base.

Since the lids applied to some bases may be of a depth which substantially equals the depth of the base itself, the camming strips 94 are preferably provided to move both the rod 72 and the sleeve 74 of the pin assembly 26 downward far enough to assure complete nesting of the lid with the base. However, the lip 66 of the head 64 on rod 72 will in any event engage the rear end of the box as shown in FIG. 10 to assure continued movement of the closed box along the supporting members 98 from the lid applying station 16 to the delivery point 20 at the right-hand end of the equipment. At the same time, hold down strips 114 preferably extend from the brush or pressing means 96 to the delivery point 20 above the filled boxes to prevent any lid from rising away from the base to which it is applied in the event the bases are filled quite full or folded cards within the bases tend to push the lid upward.

In order to control the operation of the equipment and insure the presence of a lid for each base delivered to the lid applying station 16, the lower end portion 106 of the lid supplying means 56 is preferably provided with feeler elements such as the yieldable spring members 116 which project inward adjacent the opposite edges of the lid feeding belt 36 and into positions in which they will be engaged by the lids 18 being advanced by the belt 36. Micro switches 118 mounted on the end portion 106 are actuated by the feeler elements 116 to control the operation of motor 32 so as to stop the motor and lid feeding belt 36 and prevent continued forward movement of the bases 10 by chain 28 and fingers 26 when the supply of lids has been exhausted. The lid feeding belt 36 is preferably advanced at a rate to insure the presence of a lid in position to be applied to every base. Therefore, the lids may merely rest in place on the belt and allow the belt 36 to slip beneath the lids so that it may continue to advance as long as bases are being supplied even though the lids are held against continued forward movement by the brush 96. In this way, the absence of bases in the equipment will not result in improper operation. The equipment will instead continue to operate properly whenever, and as long as, both bases and lids are presented together to the lid applying station 16.

The equipment thus provided is entirely automatic and may be operated rapidly and accurately to assure the proper positioning of cards within the confines of each base and the proper application of lids thereto without danger of crushing or jamming of the covers as they are pressed down onto and about the bases of the boxes.

In order to permit use of the equipment in applying lids or covers to the bases of boxes of substantially different dimensions, the various elements of the equipment are preferably rendered adjustable. For this purpose, adjusting screws 102 are provided as shown in FIGS. 1, 2 and 5 at suitable points throughout the length of the equipment and are connected to the base and box guiding members 4 and to the box supporting members 98. The adjusting screws 102 have intermeshing gears 120 on one end thereof and one of the adjusting screws has a hand wheel 122 secured to the other end thereof. Therefore, upon rotation of the hand wheel 122, the adjusting screws 102 are rotated in opposite directions to move the box guiding members 4 and box supporting members 98 in opposite directions to increase or decrease the spacing thereof to receive and guide bases and boxes of any desired width. Furthermore, in order to assure similar movement of elements and keep them in parallel relation, the adjusting screws 102 may be connected together by a chain 124 so that all of the adjusting screws will be rotated simultaneously and to the same extent upon operation of hand wheel 122.

In a similar way, the lid supplying means 56 may be provided with adjusting screws 102A operable by a hand wheel 122A and chain 124A to adjust the spacing of the guide means 52 of the frame 54 along which the lids 18 are moved.

In order to permit the application of lids to bases of any desired height, the lower end portion 106 of the lid applying means 56 is pivotally connected at 130 on the frame 52 of the lid applying means. The extremity 107 of the lower end portion 106 may thus be raised or lowered to space the extremity of suitable distance from the base supporting means 98 to permit the bases 10 to pass beneath the same. At the same time, the extremity may also be positioned low enough to insure engagement and nesting of the downwardly projecting front end 108 of each lid with the front end 110 of each base.

In a similar way, the brush or pressing member 96 is vertically adjustable to insure proper engagement thereof with the lids 18 in any adjusted position of the lower end portion 106 and extremity 107 of the lid supplying means. For this purpose, the pressing member 96 is carried by a frame 132 supported on an arm 134 pivotally mounted at 136 on the main frame 2 as shown in FIG. 1. The frame 132 and pressing member 96 are thus movable to suitable positions and are held in place by suitable means such as a counter-balancing spring 138 attached to a cable 140 which passes about a fixed rod 142 mounted on the main frame 2 and secured to the lower end of frame 132.

Figure 12:
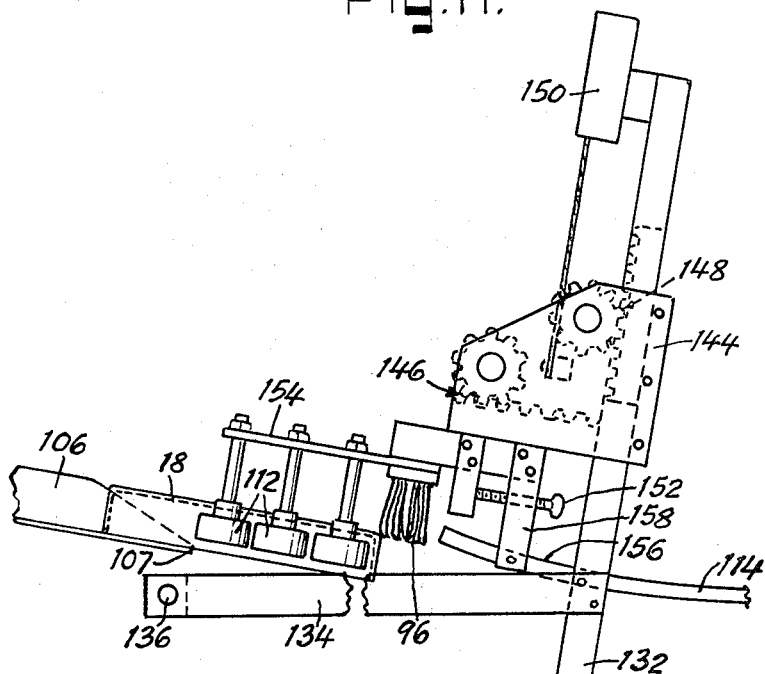
FIG. 12 is a side elevation of the frame and pressing means located at the lid applying station of the equipment.

Further in order to provide for adjustments in the position of the brush or pressing member 96 and the amount of pressure exerted thereby in applying the lids or covers to the bases of the box, the pressing member is mounted for vertical and longitudinal adjustment with respect to the box supporting members 98 and the extremity 107 on the lower end 106 of the lid supplying means 56. For this purpose, the pressing member 96 may be secured to a carriage 144 on frame 132 as shown in FIG. 12. The carriage 144 with the brush 96 is movable longitudinally toward and away from the extremity 107 by a rack and pinion assembly 146 and is movable vertically by the rack and pinion assembly 148 on frame 132. The carriage 144 may be counterbalanced on frame 132 by a spring 150 and held in adjusted position by thumb screw 152. The rollers 112 which engage the sides of the lids 18 as they are projected into engagement with the brush or pressing member 96 are adjustably mounted on extensions 154 secured to the brush 96. The ends 156 of the hold down strips 114 are preferably connected to the connection 158 on the carriage 144 by which the pressing member 96 is carried so as to assure proper location of the hold down strips when the equipment is used to apply lids to bases of different height.

It will thus be apparent that the equipment is readily adjustable to permit handling of different sizes and shapes of boxes so as to be extremely flexible in its operation and use. It will also be apparent that the form, shape, arrangement and construction of the various elements of the combination are capable of numerous changes and modifications in carrying out the principles of the present invention. In view thereof, it should be understood that the particular embodiment of the invention shown in the drawings and described above is intended to be illustrative only and is not intended to limit the scope of the invention.

We claim:

1. A machine for applying covers to the bases of boxes comprising base supporting means, means for moving bases along said supporting means to an assembly point, cover supplying means located above said base supporting means adjacent said assembly point, pressing means located adjacent said assembly point in position to urge a cover removed from said supply means downward into assembled relation with a base located on said base supporting means, and cover engaging and guiding means located at the rear of a base to which a cover is being applied at said assembly point, said cover engaging and guiding means initially extending above the rear end of the base into position to be engaged by the rear end of a cover and being movable downwardly with the cover to guide the rear end of the cover into a position on the exterior of the rear end of the base when the cover is pressed downward into assembled relation with a base by said pressing means.

2. A machine for applying covers to the bases of boxes comprising base supporting means, a chain extending parallel to said base supporting means and having fingers carried thereby and engagable with bases located on said support to move said bases along said support, cover supplying means located above said base supporting means, means for moving covers along said cover supplying means into positions wherein one end of each cover will engage and fit about the leading end of a base moving along said supporting means, pressing means engageable with each cover to press the cover downwardly onto a base, and cover engaging and guiding means movable vertically with respect to each base adjacent said pressing means to engage and guide a cover in its downward movement under the action of said pressing means.

3. A machine as defined in claim 2 wherein said cover engaging and guiding means are carried by a chain and movable parallel to said base supporting means in engagement with the rear ends of the bases to which said covers are being applied.

4. A machine as defined in claim 3 wherein the cover engaging and guiding means are inclined forwardly and are centered with respect to the rear ends of the bases engaged thereby to press said rear ends inwardly when the covers are applied to the bases.

5. A machine for applying covers to the bases of boxes comprising base supporting means, a plurality of longitudinally spaced base advancing members, conveying means by which said base advancing members and the bases of boxes are movable along said base supporting means to an assembly point, cover supplying means located above said base supporting means adjacent said assembly point, pressing means located adjacent said assembly point to urge a cover removed from said cover supply means downward into assembled relation with a base located on said base supporting means, said base advancing members each being mounted on an assembly secured to said conveying means and movable vertically with respect to said assembly into a position wherein they project above the base supporting means, and means for varying the distance to which said base advancing members project above said base supporting means.

6. A machine as set forth in claim 5 wherein spring means engage each base advancing member to move said member with respect to the assembly on which it is mounted.

7. A machine as set forth in claim 6 wherein cam means are located adjacent said base supporting means and engageable with an element of each assembly for moving said base advancing members with respect to said assemblies against the action of said spring means.

References Cited

UNITED STATES PATENTS

| | | | |
|---|---|---|---|
| 1,525,169 | 2/1925 | De Leers | 53—169 |
| 3,245,202 | 4/1966 | Stephens et al. | 53—315 |

TRAVIS S. McGEHEE, Primary Examiner.

E. F. DESMOND, *Assistant Examiner.*